United States Patent
Saeki et al.

(10) Patent No.: US 9,499,046 B2
(45) Date of Patent: Nov. 22, 2016

(54) SPILL-PREVENTING FUEL INTAKE ASSEMBLY

(71) Applicant: ILLINOIS TOOL WORKS INC., Glenview, IL (US)

(72) Inventors: Takashi Saeki, Aichi (JP); Edward Phillips, Kanagawa (JP)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/781,915

(22) PCT Filed: Mar. 27, 2014

(86) PCT No.: PCT/US2014/032064
§ 371 (c)(1),
(2) Date: Oct. 2, 2015

(87) PCT Pub. No.: WO2014/168764
PCT Pub. Date: Oct. 16, 2014

(65) Prior Publication Data
US 2016/0059691 A1 Mar. 3, 2016

Related U.S. Application Data (60) Provisional application No. 61/810,366, filed on Apr. 10, 2013.

(51) Int. Cl.
*B60K 15/04* (2006.01)

(52) U.S. Cl.
CPC ........... *B60K 15/04* (2013.01); *B60K 15/0406* (2013.01); *B60K 2015/0429* (2013.01); *B60K 2015/0461* (2013.01); *B60K 2015/0483* (2013.01); *B60K 2015/0487* (2013.01)

(58) Field of Classification Search
CPC .... B60K 15/04; B60K 15/0406; F04F 10/00
USPC ............. 220/86.2, 86.1, 254.6, 254.3, 254.1, 220/259.2, 259.1, 256.1; 137/151, 614.06, 137/614.05, 613, 614.11
See application file for complete search history.

(56) References Cited

U.S. PATENT DOCUMENTS 3,364,944 A * 1/1968 McGay ................. F16K 1/2028
137/527.4
6,983,773 B1 1/2006 Hagano et al.
2005/0199315 A1 9/2005 Scharrer
(Continued)

FOREIGN PATENT DOCUMENTS

DE 20206097 U1 6/2003
DE 102012022394 A1 5/2014
(Continued)

OTHER PUBLICATIONS

ISR and WO for PCT/US2014/032064 mailed Jun. 18, 2014.

*Primary Examiner* — Robert J Hicks
(74) *Attorney, Agent, or Firm* — Joseph M. Butscher; The Small Patent Law Group, LLC (57) ABSTRACT

A fuel intake assembly includes a housing, a nozzle inlet door, a nozzle outlet door, and an outlet door-engaging link. The housing defines an internal chamber. A nozzle passage channel extends through the internal chamber. The nozzle inlet and outlet doors are moveably secured within the housing and are both configured to move between open and closed positions. The outlet door-engaging link may be moveably secured to the nozzle inlet door. Movement of the nozzle inlet door toward the open position causes the outlet door-engaging link to engage the nozzle outlet door so that a fluid passage is formed between at least a portion of the nozzle outlet door and an internal surface of the housing.

19 Claims, 5 Drawing Sheets

(56) References Cited

U.S. PATENT DOCUMENTS

| | | | |
|---|---|---|---|
| 2006/0032549 A1* | 2/2006 | McClung | B60K 15/04 141/97 |
| 2006/0060581 A1* | 3/2006 | Foltz | B60K 15/04 220/265 |
| 2006/0096662 A1* | 5/2006 | King | B60K 15/04 141/367 |
| 2009/0188582 A1* | 7/2009 | Hagano | B60K 15/04 141/349 |
| 2009/0189106 A1 | 7/2009 | Hagano et al. | |

FOREIGN PATENT DOCUMENTS

| | | | |
|---|---|---|---|
| EP | 1329353 A1 | 7/2003 | |
| EP | 1574380 A2 | 9/2005 | |
| WO | 03086805 A1 | 10/2003 | |
| WO | WO 2010021829 A1 * | 2/2010 | B60K 15/04 |
| WO | 2014078723 A1 | 5/2014 | |

* cited by examiner

SPILL-PREVENTING FUEL INTAKE ASSEMBLY

RELATED APPLICATIONS

This application is a National Phase of International Application No. PCT/US2014/032064 filed Mar. 27, 2014 and relates to and claims priority benefits from U.S. Provisional Patent Application No. 61/810,366 filed Apr. 10, 2013, which is hereby incorporated by reference in its entirety.

FIELD OF THE DISCLOSURE

Embodiments of the present disclosure generally relate to fuel intake systems of vehicles, and more particularly, to fuel intake assemblies that are configured to prevent fuel spills and drain leaked fuel into a fuel tank.

BACKGROUND OF THE DISCLOSURE

Various vehicles, such as automobiles, are powered by gasoline, diesel fuel, or the like. As such, the vehicles typically include fuel systems having a tank configured to retain fuel, such as gasoline or diesel fuel, and a fuel fill pipe that serves as an inlet for supplying fuel to the tank from a fuel nozzle of a refueling station. In general, a fuel fill pipe includes an opening that may be exposed during refueling to receive the nozzle. An exposed end portion of the fuel pipe is of sufficient size to receive a discharge tube of a refueling nozzle. The nozzle typically fits relatively loosely in the fuel fill pipe so that the nozzle may be quickly and easily inserted and removed from the fuel fill pipe.

Many passenger and commercial vehicles are powered through diesel fuel. The automotive industry continues to produce diesel powered vehicles at an increasing rate. Refueling stations provide diesel fuel for customers. Indeed, in Europe, nearly 50% of all passenger vehicles are powered by diesel fuel.

However, many diesel powered vehicles are susceptible to being mis-fueled (for example, mistakenly fueled) with gasoline. Gasoline nozzles typically are smaller than diesel nozzles and may be inserted into a refueling orifice of a diesel powered vehicle. Conversely, the larger size of a diesel nozzle typically prevents it from being inserted into the smaller refueling orifice of a gasoline powered vehicle.

Accordingly, various fuel systems include a mis-fuel inhibitor (MFI). In general, an MFI is a device configured to prevent a gasoline nozzle from being inserted into a diesel fuel tank, or vice versa. For example, one type of MFI includes an inlet having an opening that prevents mis-fueling by nozzles having a diameter that exceeds that of the opening. As an example, the MFI may include top and bottom doors. While an improper nozzle may be inserted past the top door, the nozzle generally is unable to engage the bottom door as the diameter of the nozzle is too large to pass through a passage proximate to the bottom door. Another type of MFI includes a locking bottom door that only allows a complimentary nozzle to fit therethrough.

Figures 1, 2, 3:
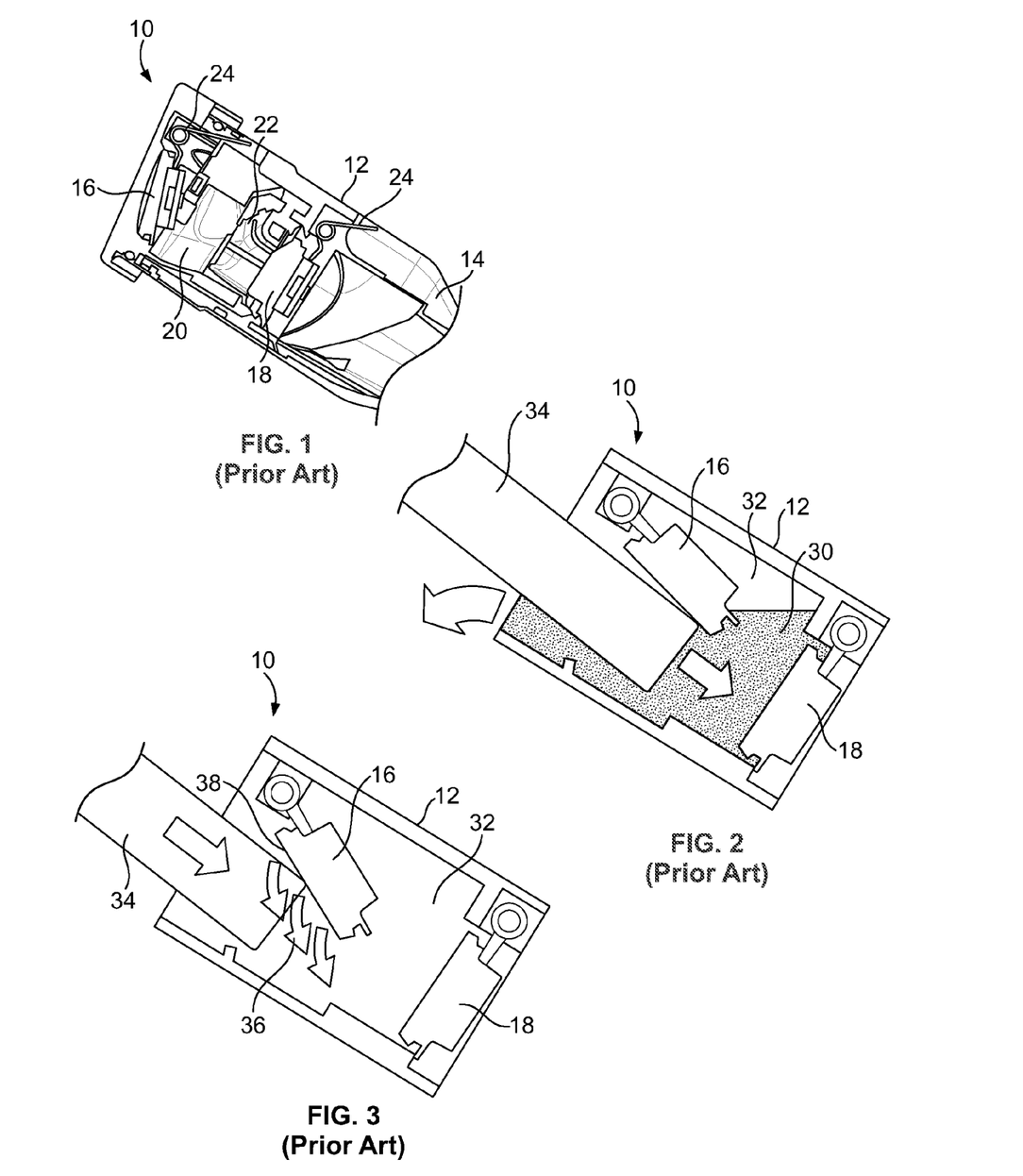
FIG. 1 illustrates an internal view of a known mis-fuel inhibitor (MFI).
FIG. 2 illustrates a simplified internal view of a known MFI having leaked fuel within an internal chamber.
FIG. 3 illustrates a simplified internal view of a known MFI in which debris infiltrates an internal chamber.

FIG. 1 illustrates an internal view of an MFI 10. As shown in FIG. 1, the MFI 10 includes a cover 12 secured to a fuel fill pipe 14. The MFI 10 includes a nozzle inlet door 16 and a nozzle outlet door 18 disposed within a nozzle passage channel 20 within the cover 12. The nozzle inlet and outlet doors 16 and 18 are configured to cooperate to ensure that an improper or incompatible fuel nozzle is not allowed to pass into the fuel fill pipe 14, thereby preventing the improper fuel nozzle from dispensing fuel into the fuel fill pipe 14. A restricting device 22, such as inwardly-directed ribs or fins, may be disposed between the nozzle inlet and outlet doors 16 and 18. The restricting device 22 is configured to prevent an improper fuel nozzle from passing therethrough. For example, the improper fuel nozzle may be too large to fit through a passage defined by the restricting device 22.

Even if the improper fuel nozzle is large enough to pass through the restricting device 22, one or both of the nozzle inlet and outlet doors 16 and 18 may include locking features that are configured to lock onto a distal tip of the improper fuel nozzle. For example, an opening may be formed in one or both of the nozzle inlet and outlet doors 16 and 18. The opening is configured to securely retain the distal tip of the improper fuel nozzle, thereby preventing the improper fuel nozzle from pivoting the door(s) 16 and 18 open.

As shown, each of the nozzle inlet and outlet doors 16 and 18 includes a pivot axle 24 that is pivotally secured to a top internal portion of the cover 12. As such, both the nozzle inlet and outlet doors 16 and 18 are configured to open in the same direction. In particular, each of the nozzle inlet and outlet doors 16 and 18 are configured to swing open toward the fuel fill pipe 14 about the pivot axles 24.

FIG. 2 illustrates a simplified internal view of the MFI 10 having leaked fuel 30 within an internal chamber 32. When a fuel nozzle 34 is inserted into the MFI 10, the fuel nozzle 34 may prematurely dispense or leak the fuel 30 into the internal chamber 32. As such, the leaked fuel 30 pools within the internal chamber 32, and may spill out of the internal chamber 32 in a direction that is away from the fuel fill pipe. In this manner, the leaked fuel 30 may spill out of a vehicle.

FIG. 3 illustrates a simplified internal view of the MFI 10 in which debris 36 infiltrates the internal chamber 32. The debris 36, such as dust, may collect on an outer surface of the nozzle inlet door 16 during regular operation of the vehicle. When the fuel nozzle 34 engages the fuel inlet door 16, a front face 38 of the fuel inlet door 16 moves toward a parallel position with a lower portion of the cover 12. Consequently, the debris 36 that collected on the front face 38 may fall into the internal chamber 32 by way of gravity.

Accordingly, known MFIs are susceptible to fuel pooling and spilling out of an internal chamber. The spilling fuel causes a safety hazard in that it may spill onto an individual, and/or onto outside surfaces and pose a fire hazard, as the fuel is flammable. Further, debris that collects within the internal chamber may contaminate fuel, thereby reducing the performance of the vehicle.

Additionally, many fuel additives are unable to be easily dispensed into a fuel tank because fuel outlets of additive cans or bottles are typically not long enough to reach a nozzle outlet door. As such, a path to the fuel fill pipe is blocked by the closed nozzle outlet door.

SUMMARY OF THE DISCLOSURE

Certain embodiments of the present disclosure provide a fuel intake assembly that may include a housing, a nozzle inlet door, a nozzle outlet door, and an outlet door-engaging link. The housing defines an internal chamber. A nozzle passage channel extends through the internal chamber. The nozzle inlet door is moveably secured within the housing, and is configured to move between open inlet and closed inlet positions. The nozzle outlet door is moveably secured within the housing, and is configured to move between open outlet and closed outlet positions. The outlet door-engaging link is moveably secured to the nozzle inlet door. Movement of the nozzle inlet door toward the open inlet position causes the outlet door-engaging link to engage the nozzle outlet door so that a fluid passage is formed between at least a portion of the nozzle outlet door and an internal surface of the housing. The fluid passage allows fuel within the internal chamber to flow past the nozzle outlet door. The fluid passage may be formed when a fuel nozzle or neck of a container directly contacts the fuel inlet door but does not directly contact the fuel outlet door.

The nozzle inlet door may be pivotally secured to a first internal surface of the housing. The nozzle outlet door may be pivotally secured to a second internal surface of the housing. The first internal surface may be opposite from the second internal surface. For example, the first internal surface may be a lower surface, while the second internal may be an upper surface, or vice versa.

The nozzle inlet door may be configured to pivot into the open inlet position in a first direction, and the nozzle inlet door may be configured to pivot into the open outlet position in a second direction. At least a first component (such as an upward component) of the first direction may be opposite from at least a second component (such as a downward component) of the second direction.

The outlet door-engaging link may be pivotally secured to a rear surface of the nozzle inlet door. The outlet door-engaging link may be configured to abut into a front surface of the nozzle outlet door when the nozzle inlet door is moved toward the open inlet position.

The outlet door-engaging link may include a linear extension beam having a proximal end pivotally secured to a rear surface of the nozzle inlet door, and a canted outlet door-engaging beam extending from the linear extension beam. The canted outlet door-engaging beam may include a distal end that is configured to be moved into a front surface of the nozzle outlet door.

The fuel intake assembly may also include a drain that is outside of the internal chamber. The drain is configured to connect to a fuel tank so that fuel that enters the drain passes to the fuel tank.

The outlet door-engaging link may be configured to engage and prop the nozzle outlet door open in a semi-open outlet position when the nozzle inlet door is in a fully open inlet position. The nozzle inlet door may be configured to retain debris on a front face when the nozzle inlet door is in the open inlet position to reduce a possibility of the debris falling into the internal chamber.

In at least one embodiment, the fuel intake assembly may include a mis-fuel inhibitor (MFI) assembly.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

Figure 4:
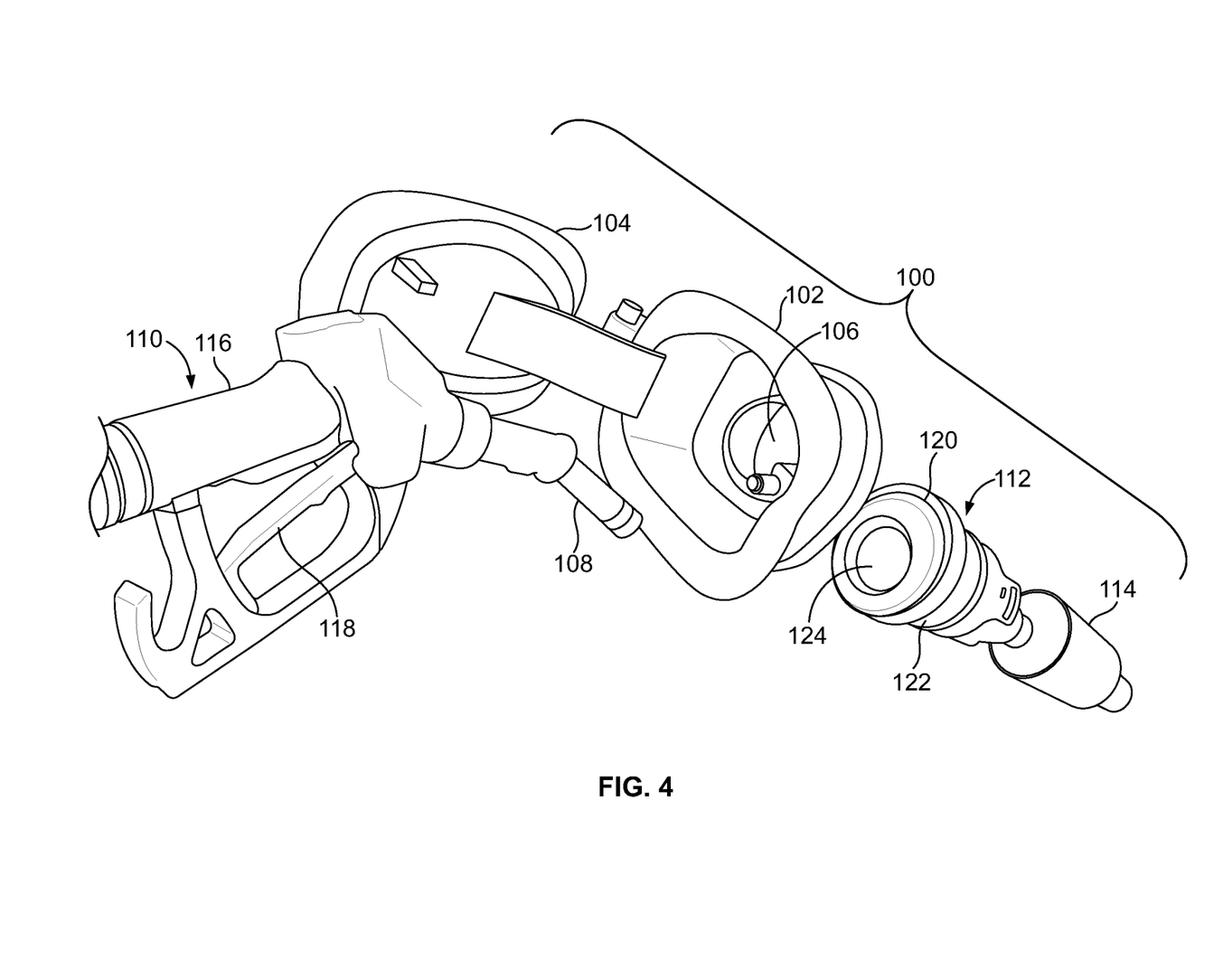
FIG. 4 illustrates a perspective view of a fuel intake system, according to an embodiment of the present disclosure.

FIG. 4 illustrates a perspective view of a fuel intake system 100, according to an embodiment of the present disclosure. The fuel intake system 100 may include a nozzle-receiving housing 102, which may be secured to a frame of a vehicle, for example. The nozzle-receiving housing 102 may include a door 104 that pivotally connects to the housing 102. The door 104 is configured to be pivoted between open and closed positions. The housing 102 defines an opening 106 into which a nozzle 108 of a fuel-dispensing device 110 may be inserted.

The housing 102 may directly or indirectly connect to a mis-fuel inhibitor (MFI) assembly 112. The MFI assembly 112 is configured to prevent improper fuel-dispensing devices (for example, fuel-dispensing devices that are incompatible with the fuel intake system 100) from dispensing fuel into a fuel fill pipe 114 connected to the MFI assembly 112. For example, the MFI assembly 112 prevents a diesel fuel-dispensing device from being inserted into a gasoline fuel intake system, or vice versa. For example, a diesel fuel-dispensing device is an improper or incompatible fuel-dispensing device in relation to a gasoline fuel intake system, while a gasoline fuel-dispensing device is an improper or incompatible fuel-dispensing device in relation to a diesel fuel intake system.

The fuel-dispensing device 110 includes a handle 116 operatively connected to a trigger 118. The handle 116 is configured to be grasped by an operator and connects to the nozzle 108.

A capless cover 120 may be secured to an inlet end 122 of the MFI assembly 112. The capless cover 120 includes a moveable door 124 configured to be engaged by a distal end of the fuel nozzle 108. The capless cover 120 may be opened through the fuel nozzle 108 being urged into the moveable door 124, as opposed to an individual grasping and removing a cap, such as a threaded cap, that would otherwise be secured to the MFI assembly 112. Alternatively, instead of the capless cover 120, the fuel intake system 100 may include a cap that threadably engages the inlet end 122 of the MFI assembly 112, and is configured to be grasped by an individual and removed, such as by the individual rotating the cap off of the inlet end 122.

The MFI assembly 112 and the capless cover 120 are examples of fuel intake assemblies. Embodiments of the present disclosure may be used with various types of fuel intake assemblies, such as the MFI assembly 112, the capless cover 120, inlet ends of the fuel fill pipe 114, and the like.

Figure 5:
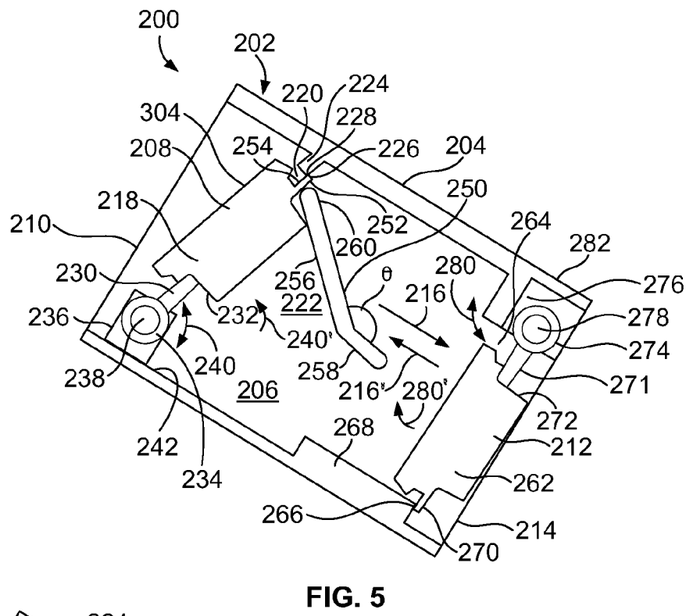
FIG. 5 illustrates an internal view of a fuel intake assembly, according to an embodiment of the present disclosure.

FIG. 5 illustrates an internal view of a fuel intake assembly 200, according to an embodiment of the present disclosure. The fuel intake assembly 200 may be an MFI assembly, a capless cover, an inlet end of a fuel fill pipe, or various other portions of a fuel intake system that are configured to receive a fuel nozzle.

The fuel intake assembly 200 includes a housing 202 having an outer circumferential wall 204 that defines an internal chamber 206. For example, the outer circumferential wall 204 may be a cylindrical, tubular wall. Alternatively, the outer circumferential wall 204 may be various other shapes and sizes.

A nozzle inlet door 208 is disposed proximate to an inlet 210 of the housing 202. A nozzle outlet door 212 is disposed proximate to an outlet 214 of the housing 202. The nozzle outlet door 212 is downstream from the nozzle inlet door 208. Downstream and upstream are in relation to the intended direction of fuel to flow from a fuel nozzle toward a fuel fill pipe in the direction of arrow 216. For example, fuel is intended to flow downstream from an area proximate to the outlet 214 toward the fuel fill pipe in the direction of arrow 216. In contrast, pooled fuel would tend to backflow upstream from the outlet 214 in the direction of arrow 216'.

While the nozzle inlet door 208 is shown proximate to the inlet 210, the nozzle inlet door 208 may alternatively be disposed further into the internal chamber 206 toward the nozzle outlet door 212. Similarly, while the nozzle outlet door 212 is shown proximate to the outlet 214, the nozzle outlet door 212 may alternatively be disposed further into the internal chamber toward the nozzle inlet door 208.

The nozzle inlet door 208 includes a covering flap or panel 218 that blocks an inlet opening 220 of a nozzle passage channel 222 that passes through the internal chamber 206. The covering panel 218 may include a circular flap that sealingly engages a ledge 224 of the housing 202 that is inwardly directed into the internal chamber 206. As such, the covering panel 218 may include a seal 226 that sealingly engages a downstream surface 228 of the ledge 224. Optionally, the ledge 224 may include a seal that sealingly engages a portion of the covering panel 218.

A hinge beam 230 downwardly extends from a lower surface 232 of the covering panel 218. The hinge beam 230 includes a pivot member 234 that pivotally secures to an axle bearing 236 of the housing 202 that extends upwardly from the outer circumferential wall 204. For example, the pivot member 234 may include a tube that pivotally secures around a rod of the axle bearing 236. Alternatively, the pivot member 234 may include an integral axle rod that is pivotally secured into a reciprocal housing of the axle bearing 236. The pivot member 234 defines a pivot axis 238 about which the nozzle inlet door 208 is configured to pivot between open and closed positions in the directions of arc 240. Pivotal motion of the nozzle inlet door 208 in the direction of arc 240' is limited by the interface between the seal 226 and the ledge 224.

As shown, the pivot member 234 is pivotally secured to the axle bearing 236 at a lower internal portion 242 of the housing 202. An outlet door-engaging member or link 250 extends from a rear surface 252 of the nozzle inlet door 208 at an upper end 254 of the covering panel 218 that is distally located from the pivot member 234. As shown, the outlet door-engaging link 250 and the pivot member 234 may be disposed proximate to opposite ends of the covering panel 218.

The outlet door-engaging link 250 may include a linear extension beam 256 that is integrally connected to a canted outlet door-engaging beam 258. The linear extension beam 256 may connect to the outlet door-engaging beam 258 at an angle θ, which may be an obtuse angle, such as between 100°-135°. Alternatively, the angle θ may be less than 100° or greater than 135°.

The extension beam 256 includes a proximal end 260 that pivotally secures to a reciprocal member of the covering panel 218. As one example, the extension beam 256 may include a cylindrical pin that pivotally secures to a reciprocal channel formed on or in the covering panel 218. Alternatively, the covering panel 218 may include a cylindrical pin that pivotally secures to a reciprocal channel formed on or in the proximal end 260 of the covering panel 218. A torsion spring may be disposed between the interface of the extension beam and the reciprocal member of the covering panel 218 in order to bias the outlet door-engaging link 250 toward the rear surface of the covering panel 218.

The nozzle outlet door 212 includes a covering flap or panel 262 that blocks an outlet opening 264 of the nozzle passage channel 222. The covering panel 262 may include a circular flap that sealingly engages a trailing edge 266 of a mesa 268 of the housing 202 that upwardly extends into the internal chamber 206. As such, the covering panel 262 may include a seal 270 that sealingly engages the trailing edge 266. Optionally, the mesa 268 may include a seal that sealingly engages a portion of the covering panel 262.

A hinge beam 271 upwardly extends from an upper surface 272 of the covering panel 262. The hinge beam 271 includes a pivot member 274 that pivotally secures to an axle bearing 276 of the housing 202 that extends downwardly from the outer circumferential wall 204. For example, the pivot member 274 may include a tube that pivotally secures around a rod of the axle bearing 276. Alternatively, the pivot member 274 may include an integral axle rod that is pivotally secured into a reciprocal housing of the axle bearing 276. The pivot member 274 defines a pivot axis 278 about which the nozzle outlet door 212 is configured to pivot between open and closed positions in the directions of arc 280. Pivotal motion of the nozzle outlet door 212 in the direction of arc 280' is limited by the interface between the seal 270 and the trailing edge 266.

As shown, the pivot member 274 is pivotally secured to the axle bearing 276 at an upper internal portion 282 of the housing 202. The pivot member 274 of the nozzle outlet door 212 may be at an opposite portion of the housing 202 in relation to the pivot member 234 of the nozzle inlet door 208. For example, as shown in FIG. 5, the pivot member 274 is at the upper internal portion 282 of the housing 202, while the pivot member 234 is at the lower internal portion 242 of the housing 202. Alternatively, the orientations may be switched, such that the pivot member 234 of the nozzle inlet door 208 is at the upper internal portion 282, while the pivot member 274 of the nozzle outlet door 212 is at the lower internal portion 242. The nozzle inlet and outlet doors 208 and 212, respectively, may be pivotally attached to the housing 202 at opposite sides of the housing, such that the pivotal engagements with the housing 202 are 180° offset from one another.

Figure 6:
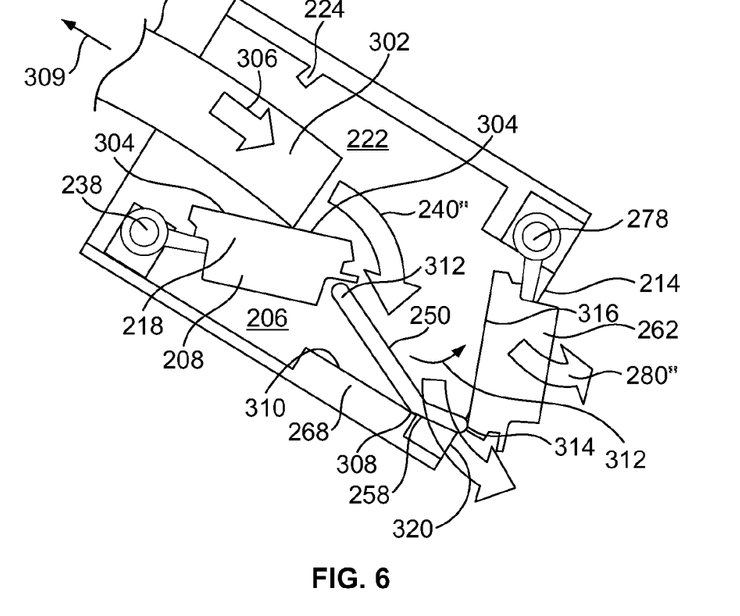
FIG. 6 illustrates an internal view of a fuel intake assembly receiving a fuel nozzle, according to an embodiment of the present disclosure.

FIG. 6 illustrates an internal view of the fuel intake assembly 200 receiving a fuel nozzle 300, according to an embodiment of the present disclosure. As a distal tip 302 of the fuel nozzle 300 is urged into a front face 304 of the covering panel 218 of the nozzle inlet door 208 in an insertion direction 306, the nozzle inlet door 208 downwardly pivots in the direction of arc 240" about the pivot axis 238. During the pivotal movement, the nozzle inlet door 208 disengages from the ledge 224, thereby opening the inlet opening 220. As such, the fuel nozzle 300 may pass into the nozzle passage channel 222.

With continued urging of the fuel nozzle 300 in the insertion direction 306, a lower surface 308 of the outlet door-engaging beam 258 of the outlet door-engaging link 250 slides over an upper surface 310 of the mesa 268, causing the outlet door-engaging beam 258 to pivot upwardly about the pivot axle 312 defined between an interface of the proximal end 260 of the outlet door-engaging link 250 and the reciprocal member of the covering panel 218. As the fuel nozzle 300 continues to be urged in the insertion direction 306, a distal end 314 of the link 250 is urged into a front face 316 of the covering panel 262 of the nozzle outlet door 212, thereby forcing the nozzle outlet door 212 to pivot into an open position in the direction of arc 280" about the pivot axis 278. In this manner, as the nozzle inlet door 208 opens, the outlet door-engaging link 250 that is pivotally secured to a rear upper surface of the nozzle inlet door 208 operates to prop the nozzle outlet door 212 open to form a fluid passage 320 from the internal chamber 206 to the outlet 214.

As shown, the nozzle inlet door 208 is configured to open in a direction having a component that is opposite that of a component of an opening direction of the nozzle outlet door 212. For example, the nozzle inlet door 208 is configured to open in a downward direction as shown by arc 240", while the nozzle outlet door 212 is configured to open in an upward direction as shown by arc 280". Note, however, that each of the arcs 240" and 280" have components that are toward the outlet 214. Similarly, the nozzle inlet door 208 is configured to close in a direction having a component that is opposite that of a component of a closing direction of the nozzle outlet door 212.

As the fuel nozzle 300 is removed from the fuel intake assembly 200 in the direction of arrow 309, any fuel that may leak out of the fuel nozzle 300 drains through the fluid passage 320 due to the outlet door-engaging link 250 still propping the nozzle outlet door 212 open. As the fuel nozzle 300 is fully removed from the fuel intake assembly 200, the nozzle inlet and outlet doors 208 and 212 and the outlet door-engaging link 250 may return to their at-rest positions, as shown in FIG. 5. For example, the pivot interfaces of the nozzle inlet and outlet doors 208 and 212 and the outlet door-engaging link 250 may include torsion springs, for example, that tend to force the nozzle inlet and outlet doors 208 and 212 and the outlet door-engaging link 250 back to their at-rest positions. Alternatively, biasing members, such as torsion springs, may not be needed. Instead, each of the doors 208 and 212 and the outlet door-engaging link 250 may be integrally biased, such as through natural force constants, toward the at-rest positions.

Figure 7:
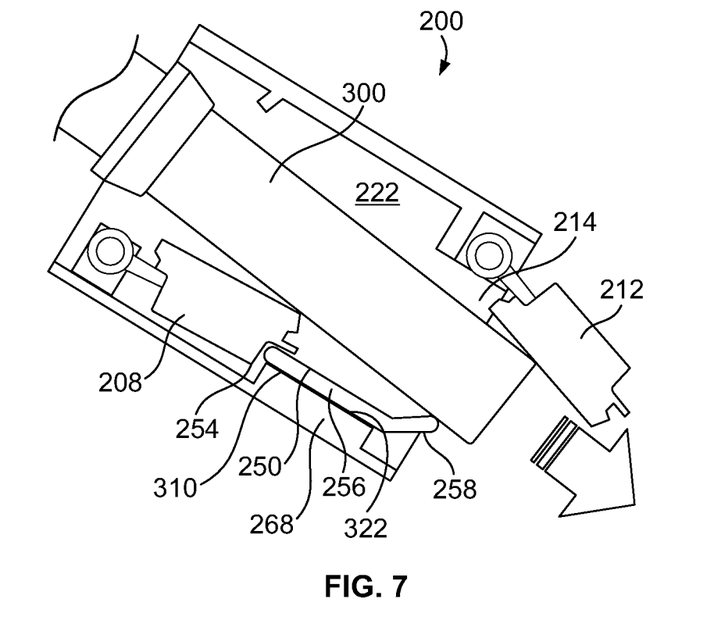
FIG. 7 illustrates an internal view of a fuel nozzle fully inserted through a fuel intake assembly, according to an embodiment of the present disclosure.

FIG. 7 illustrates an internal view of the fuel nozzle 300 fully inserted through the fuel intake assembly 200, according to an embodiment of the present disclosure. As shown, the fuel nozzle 300 passes through the nozzle passage channel 222 and forces both the nozzle inlet door 208 and the nozzle outlet door 212 into fully-opened positions. In the fully open or extend position, the upper end 254 (upper or top in relation to a closed position) may not abut against any portion of the mesa 268. However, a lower surface 322 of the extension beam 256 of the outlet door-engaging link 250 may abut against the upper surface 310 of the mesa 268. As such, the outlet door-engaging beam 258 may be upwardly canted into the outlet 214.

Figure 8:
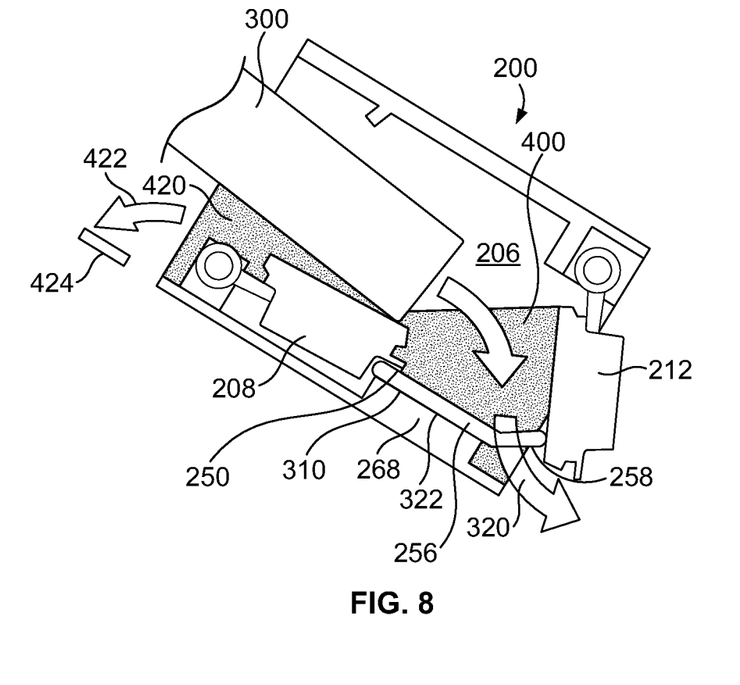
FIG. 8 illustrates an internal view of a fuel nozzle within an internal chamber of a fuel intake assembly, according to an embodiment of the present disclosure.

FIG. 8 illustrates an internal view of the fuel nozzle 300 within the internal chamber 206 of the fuel intake assembly 200, according to an embodiment of the present disclosure. As shown, the fuel nozzle 300 may fully engage the nozzle inlet door 208, but may not directly contact the nozzle outlet door 212. Because the fuel nozzle 300 fully engages the nozzle inlet door 208, the nozzle inlet door 208 may be in a fully extended position, such that a lower surface 322 of the extension beam 256 abuts against the upper surface 310 of the mesa 268, and the outlet-door engaging beam 258 fully engages the nozzle outlet door 212, thereby propping the nozzle outlet door 212 open to form the fluid passage 320. Accordingly, any fuel 400 that may have accidentally dispensed from the fuel nozzle 300 into the internal chamber 206 may flow out of the internal chamber 206 through the fluid passage 320, into the fuel fill pipe, and ultimately the fuel tank.

The length of the outlet-door engaging beam 258 may be longer or shorter than shown. For example, a longer outlet door-engaging beam 258 is configured to provide a larger fluid passage 320, while a shorter outlet-door engaging beam 258 is configured to provide a smaller fluid passage 320. The size and shape of the outlet door-engaging beam 258 may be sized and shaped to provide a fluid passage 320 of a particular desired size. The extension beam 256 may also be sized and shaped with the same considerations in mind.

Further, any fuel 420 that may be upstream from the nozzle inlet door 208 may flow out of the assembly 200 in the direction of arc 422 into a drain 424 that may be connected to the assembly 200 or to an inlet connection of a fuel intake system connected to the assembly 200. Because the fuel 400 drains through the fluid passage 320, there is less fluid that pools within the internal chamber 206. As such, there is less fuel that may backflow out of the assembly. As such, the drain 424 is able to accommodate the backflow fuel 420 so that the backflow fuel 420 does not spill out of the fuel intake system. The drain 424 may be fluidly connected to the fuel tank. Accordingly, any backflow fuel 420 is drained to the fuel tank.

Referring to FIGS. 6-8, because the nozzle inlet door 208 pivots downwardly in the direction of arc 240", any debris, such as dust, that accumulates on the front face 304 does not drop, by way of gravity, into the internal chamber 206. That is, any debris that may accumulate on the front face 304 remains thereon when the nozzle inlet door 208 is pivoted toward an open position. The front face 304 provides a retaining surface through which the debris is supported and prevented from passing therethrough and/or dropping off into the internal chamber 206.

Figure 9:
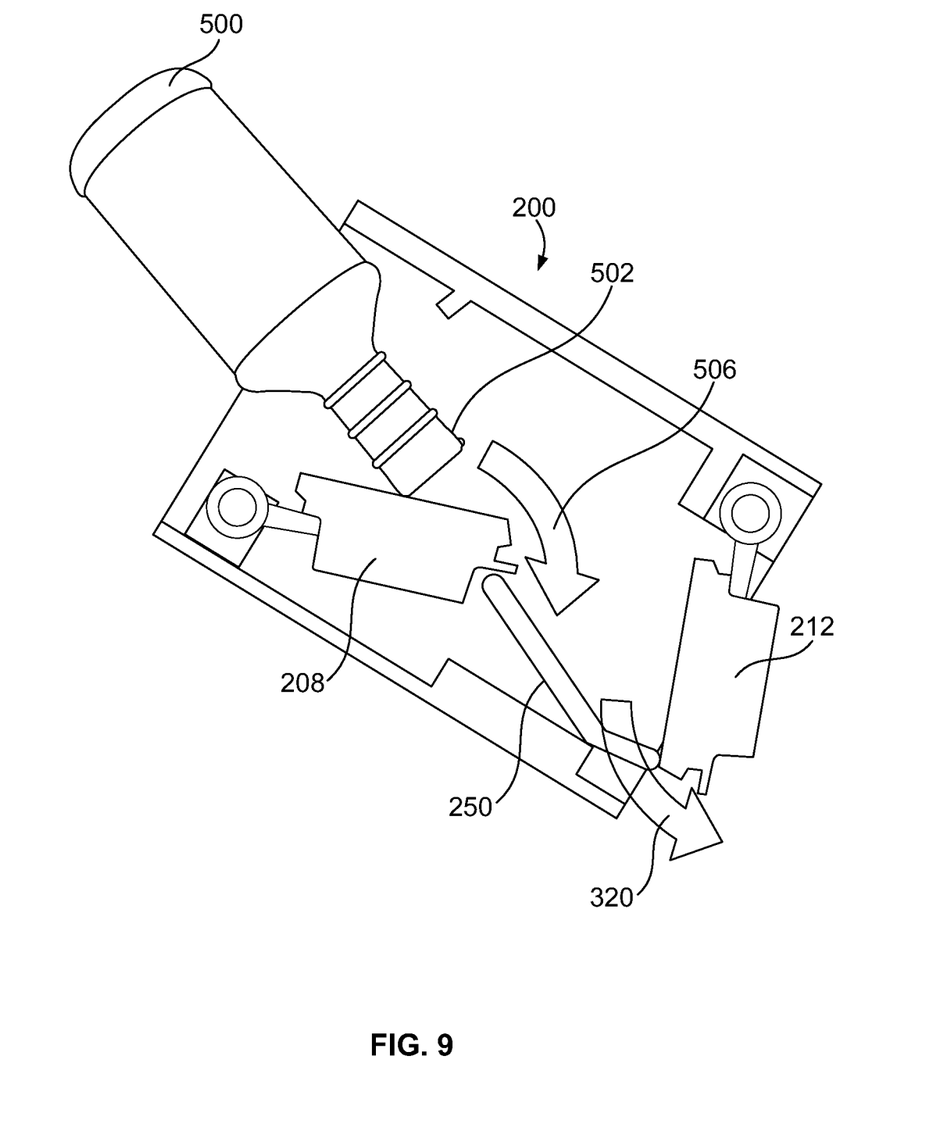
FIG. 9 illustrates an internal view of a bottle of fuel additive being inserted into a fuel intake assembly, according to an embodiment of the present disclosure.

FIG. 9 illustrates an internal view of a bottle 500 of fuel additive, such as fuel injector cleaner, being inserted into the fuel intake assembly 200, according to an embodiment of the present disclosure. As shown, a neck 502 of the bottle 500 may not be long enough to engage the nozzle outlet door 212. However, as the neck 502 engages the nozzle inlet door 208, the outlet door-engaging link 250 engages the nozzle outlet door 212, thereby propping the nozzle outlet door 212 open to form the fluid passage 320. As such, fuel additive 506 may pass into the fuel fill pipe by way of the fluid passage 320 even though the neck 502 is incapable of engaging the nozzle outlet door 212.

Embodiments of the present disclosure provide a fuel intake assembly that minimizes fuel build-up, such as through pooling or puddling, within an internal chamber of the assembly. Embodiments of the present disclosure provide a fuel intake assembly in which a nozzle outlet door is configured to be opened before or after a nozzle inlet door is fully opened so that any leaked, pooled, or puddled fuel passes into a fuel fill pipe and ultimately to a fuel tank, instead of spilling out of the assembly. Further, embodiments of the present disclosure provide a fuel intake assembly that allows fuel additives dispensed from bottles or cans that are generally not configured to contact a nozzle outlet door to dispense the additives into the fuel fill pipe.

When the nozzle inlet door opens, the nozzle outlet door opens slightly through operation of the outlet door-engaging link. During refueling, if accidental refueling begins before the nozzle outlet door is open, the excess fuel within the internal chamber is able to pass into the fuel fill pipe, thereby minimizing the risk of fuel blow back.

Embodiments of the present disclosure also provide a fuel fill assembly that is configured to keep a nozzle outlet door open as long as possible during withdrawal of a fuel nozzle, so that any leaking fuel out of the fuel nozzle is allowed to enter the pipe to the fuel tank, thereby minimizing any pooling or puddling of the fuel within the assembly. The outlet door-engaging link allows the nozzle outlet door to stay open while the fuel nozzle leaves the internal chamber of the assembly. The slight time lag allows excess fuel from the fuel nozzle to drain through the resulting fluid passage, thereby reducing the chance of fuel puddling or pooling in the internal chamber. When the fluid inlet door closes, the fuel nozzle is pulled back from the internal chamber, and any excess fuel that drips out may still pass to the fuel tank due to the delayed closing of the nozzle outlet door through operation of the outlet door-engaging link.

Embodiments of the present disclosure also reduce the possibility of debris, such as dust, entering into the fuel tank. As explained above, the nozzle inlet door downwardly pivots, thereby serving as a platform for dust to fall onto the covering panel, instead of falling into the internal chamber.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

Various features of the disclosure are set forth in the following claims.

The invention claimed is:

1. A fuel intake assembly, comprising:
a housing defining an internal chamber, wherein a nozzle passage channel extends through the internal chamber;
a nozzle inlet door moveably secured within the housing, wherein the nozzle inlet door is configured to move between open inlet and closed inlet positions, wherein the nozzle inlet door is configured to pivot into the open inlet position in a first direction;
a nozzle outlet door moveably secured within the housing, wherein the nozzle outlet door is configured to move between open outlet and closed outlet positions, wherein the nozzle outlet door is configured to pivot into the open outlet position in a second direction, wherein at least a first component of the first direction is opposite from at least a second component of the second direction; and
an outlet door-engaging link moveably secured to the nozzle inlet door, wherein movement of the nozzle inlet door toward the open inlet position causes the outlet door-engaging link to engage the nozzle outlet door so that a fluid passage is formed between at least a portion of the nozzle outlet door and an internal surface of the housing.

2. The fuel intake assembly of claim 1, wherein the nozzle inlet door is pivotally secured to a first internal surface of the housing, wherein the nozzle outlet door is pivotally secured to a second internal surface of the housing, and wherein the first internal surface is opposite from the second internal surface.

3. The fuel intake assembly of claim 1, further comprising a drain that is outside of the internal chamber, wherein the drain is configured to connect to a fuel tank.

4. The fuel intake assembly of claim 1, wherein the nozzle inlet door is configured to retain debris on a front face when the nozzle inlet door is in the open inlet position to reduce a possibility of the debris falling into the internal chamber.

5. The fuel intake assembly of claim 1, wherein the fluid passage allows fuel within the internal chamber to flow past the nozzle outlet door.

6. The fuel intake assembly of claim 1, wherein the fuel intake assembly comprises a mis-fuel inhibitor assembly.

7. The fuel intake assembly of claim 1, wherein the fluid passage is formed when a fuel nozzle or neck of a container directly contacts the fuel inlet door but does not directly contact the fuel outlet door.

8. A fuel intake assembly, comprising:
a housing defining an internal chamber, wherein a nozzle passage channel extends through the internal chamber;
a nozzle inlet door pivotally secured to a first internal surface of the housing, wherein the nozzle inlet door is configured to move between open inlet and closed inlet positions, wherein the nozzle inlet door is configured to pivot into the open inlet position in a first direction;
a nozzle outlet door pivotally secured to a second internal surface of the housing, wherein the first internal surface is opposite from the second internal surface, wherein the nozzle outlet door is configured to move between open outlet and closed outlet positions, wherein the nozzle outlet door is configured to pivot into the open outlet position in a second direction, wherein at least a first component of the first direction is opposite from at least a second component of the second direction; and
an outlet door-engaging link moveably secured to the nozzle inlet door, wherein movement of the nozzle inlet door toward the open inlet position causes the outlet door-engaging link to engage the nozzle outlet door so that a fluid passage is formed between at least a portion of the nozzle outlet door and an internal surface of the housing, wherein the fluid passage allows fuel within the internal chamber to flow past the nozzle outlet door, and wherein the outlet door-engaging link is configured to engage and prop the nozzle outlet door open in a semi-open outlet position when the nozzle inlet door is in a fully open inlet position.

9. The fuel intake assembly of claim 8, wherein the outlet door-engaging link is pivotally secured to a rear surface of the nozzle inlet door, and wherein the outlet door-engaging link is configured to abut into a front surface of the nozzle outlet door when the nozzle inlet door is moved toward the open position.

10. The fuel intake assembly of claim 8, wherein the outlet door-engaging link comprises:
   a linear extension beam having a proximal end pivotally secured to a rear surface of the nozzle inlet door; and
   a canted outlet door-engaging beam extending from the linear extension beam, wherein the canted outlet door-engaging beam includes a distal end that is configured to be moved into a front surface of the nozzle outlet door.

11. The fuel intake assembly of claim 8, further comprising a drain that is outside of the internal chamber, wherein the drain is configured to connect to a fuel tank.

12. The fuel intake assembly of claim 8, wherein the nozzle inlet door is configured to retain debris on a front face when the nozzle inlet door is in the open inlet position to reduce a possibility of the debris falling into the internal chamber.

13. The fuel intake assembly of claim 8, wherein the fuel intake assembly comprises a mis-fuel inhibitor assembly.

14. The fuel intake assembly of claim 8, wherein the fluid passage is formed when a fuel nozzle or neck of a container directly contacts the fuel inlet door but does not directly contact the fuel outlet door.

15. A fuel intake assembly, comprising:
   a housing defining an internal chamber, wherein a nozzle passage channel extends through the internal chamber;
   a drain that is outside of the internal chamber, wherein the drain is configured to connect to a fuel tank;
   a nozzle inlet door pivotally secured to a lower internal surface of the housing, wherein the nozzle inlet door is configured to move between open inlet and closed inlet positions, wherein the nozzle inlet door is configured to downwardly pivot into the open inlet position in a first direction, and wherein the nozzle inlet door is configured to retain debris on a front inlet face when the nozzle inlet door is in the open inlet position to reduce a possibility of the debris falling into the internal chamber;
   a nozzle outlet door pivotally secured to an upper internal surface of the housing, wherein the nozzle outlet door is configured to move between open outlet and closed outlet positions, wherein the nozzle outlet door is configured to upwardly pivot into the open outlet position in a second direction, wherein a downward component of the first direction is opposite from an upward component of the second direction; and
   an outlet door-engaging link pivotally secured to an upper rear surface of the nozzle inlet door, wherein the outlet door-engaging link is configured to abut into a front surface of the nozzle outlet door when the nozzle inlet door is moved toward the open inlet position, wherein movement of the nozzle inlet door toward the open position causes the outlet door-engaging link to engage the nozzle outlet door so that a fluid passage is formed between at least a portion of the nozzle outlet door and an internal surface of the housing, wherein the fluid passage is formed when a fuel nozzle or neck of a container directly contacts the fuel inlet door but does not directly contact the fuel outlet door, wherein the fluid passage allows fuel within the internal chamber to flow past the nozzle outlet door, and wherein the outlet door-engaging link is configured to engage and prop the nozzle outlet door open in a semi-open outlet position when the nozzle inlet door is in a fully open inlet position.

16. The fuel intake assembly of claim 15, wherein the outlet door-engaging link comprises:
   a linear extension beam having a proximal end pivotally secured to the rear upper surface of the nozzle inlet door; and
   a canted outlet door-engaging beam extending from the linear extension beam, wherein the canted outlet door-engaging beam includes a distal end that is configured to be moved into the front surface of the nozzle outlet door.

17. A fuel intake assembly, comprising:
   a housing defining an internal chamber, wherein a nozzle passage channel extends through the internal chamber;
   a nozzle inlet door moveably secured within the housing, wherein the nozzle inlet door is configured to move between open inlet and closed inlet positions;
   a nozzle outlet door moveably secured within the housing, wherein the nozzle outlet door is configured to move between open outlet and closed outlet positions; and
   an outlet door-engaging link moveably secured to the nozzle inlet door, wherein movement of the nozzle inlet door toward the open inlet position causes the outlet door-engaging link to engage the nozzle outlet door so that a fluid passage is formed between at least a portion of the nozzle outlet door and an internal surface of the housing, wherein the outlet door-engaging link is pivotally secured to a rear surface of the nozzle inlet door, and wherein the outlet door-engaging link is configured to abut into a front surface of the nozzle outlet door when the nozzle inlet door is moved toward the open inlet position.

18. A fuel intake assembly, comprising:
   a housing defining an internal chamber, wherein a nozzle passage channel extends through the internal chamber;
   a nozzle inlet door moveably secured within the housing, wherein the nozzle inlet door is configured to move between open inlet and closed inlet positions;
   a nozzle outlet door moveably secured within the housing, wherein the nozzle outlet door is configured to move between open outlet and closed outlet positions; and
   an outlet door-engaging link moveably secured to the nozzle inlet door, wherein movement of the nozzle inlet door toward the open inlet position causes the outlet door-engaging link to engage the nozzle outlet door so that a fluid passage is formed between at least a portion of the nozzle outlet door and an internal surface of the housing, wherein the outlet door-engaging link comprises: (a) a linear extension beam having a proximal end pivotally secured to a rear surface of the nozzle inlet door, and (b) a canted outlet door-engaging beam extending from the linear extension beam, wherein the canted outlet door-engaging beam includes a distal end that is configured to be moved into a front surface of the nozzle outlet door.

19. A fuel intake assembly, comprising:

a housing defining an internal chamber, wherein a nozzle passage channel extends through the internal chamber;

a nozzle inlet door moveably secured within the housing, wherein the nozzle inlet door is configured to move between open inlet and closed inlet positions;

a nozzle outlet door moveably secured within the housing, wherein the nozzle outlet door is configured to move between open outlet and closed outlet positions; and an outlet door-engaging link moveably secured to the nozzle inlet door, wherein movement of the nozzle inlet door toward the open inlet position causes the outlet door-engaging link to engage the nozzle outlet door so that a fluid passage is formed between at least a portion of the nozzle outlet door and an internal surface of the housing, wherein the outlet door-engaging link is configured to engage and prop the nozzle outlet door open in a semi-open outlet position when the nozzle inlet door is in a fully open inlet position.

* * * * *